US006885255B2

United States Patent
Kudo et al.

(10) Patent No.: US 6,885,255 B2
(45) Date of Patent: Apr. 26, 2005

(54) CLOCK CONTROL SYSTEM USING CONVERTING CLOCK CONTROL SECTIONS TO PROVIDE A MINIMUM CLOCK NUMBER TO OPERATE CORRESPONDING DEVICES

(75) Inventors: Makoto Kudo, Fujimi-machi (JP); Keisuke Hashimoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 88 days.

(21) Appl. No.: 10/372,119

(22) Filed: Feb. 25, 2003

(65) Prior Publication Data

US 2003/0164740 A1 Sep. 4, 2003

(30) Foreign Application Priority Data

Mar. 4, 2002 (JP) .................................. 2002-058066

(51) Int. Cl.[7] ................................................. H03B 1/00
(52) U.S. Cl. ............................ 331/74; 331/76; 713/500
(58) Field of Search ..................... 331/74, 76; 327/296, 327/299; 713/500, 600, 400

(56) References Cited

U.S. PATENT DOCUMENTS

| | | | | |
|---|---|---|---|---|
| 5,764,968 A | * | 6/1998 | Ninomiya | .................... 713/601 |
| 5,978,926 A | | 11/1999 | Ries et al. | |
| 6,686,805 B1 | * | 2/2004 | Cyrusian | ...................... 331/25 |
| 2002/0017939 A1 | * | 2/2002 | Okuda et al. | ................ 327/296 |
| 2002/0174375 A1 | * | 11/2002 | Oh | .............................. 713/500 |

FOREIGN PATENT DOCUMENTS

JP    A-7-219671    8/1995

* cited by examiner

Primary Examiner—Robert Pascal
Assistant Examiner—Joseph Chang
(74) Attorney, Agent, or Firm—Oliff & Berridge, PLC

(57) ABSTRACT

The invention saves power by supplying minimum clocks required for respective blocks. In a clock control system that supplies clocks to a plurality of blocks, such as a CPU-4, a bus, a peripheral circuit and other circuits, a clock supplied from a clock oscillator is supplied to clock control sections that are connected to the blocks, respectively. The clock is converted by the clock control sections into clocks with minimum clock numbers required to operate the blocks, respectively, and supplied to the blocks.

5 Claims, 4 Drawing Sheets

CLOCK CONTROL SYSTEM USING CONVERTING CLOCK CONTROL SECTIONS TO PROVIDE A MINIMUM CLOCK NUMBER TO OPERATE CORRESPONDING DEVICES

BACKGROUND OF THE INVENTION

1. Field of Invention

The present invention relates to a clock control system that supplies clocks to each block in a microcomputer or the like.

2. Description of Related Art

FIG. 4 shows a related art clock frequency divider system.

Specifically, FIG. 4 shows a clock oscillator 1, a frequency divider circuit 2 and a microcomputer 3 that is equipped with blocks, such as a CPU 4, a bus 5, a peripheral circuit 6 and other circuits 7. A clock provided by the clock oscillator 1 is first divided by the frequency divider circuit 2, and the clock divided at a specified ratio is supplied to each of the blocks 4–7.

In the system described above in which a single clock from the common frequency divider circuit 2 is supplied to all of the blocks 4–7, the same clock that is supplied to a block that requires a high clock number, such as the CPU 4, is also supplied to the other blocks that may require low clock numbers, such as the bus 5, the peripheral circuit 6 and the like. Power saving is beneficial in all equipment. However, the related art system, such as the one described above, has a problem because it supplies unnecessary clock numbers, and therefore cannot reduce the power consumption through supplying a minimum clock that is required for each of the blocks.

SUMMARY OF THE INVENTION

The present invention addresses or solves the above and/or other problems, and provides a clock control system that enhances power saving by supplying a minimum clock required for each block.

To address or solve the above, the present invention provides a clock control system that supplies a clock oscillated by a clock oscillator to a plurality of blocks. The clock control system includes: a plurality of clock control sections that are supplied with the clock oscillated by the clock oscillator, and a plurality of blocks connected to the clock control sections, respectively. The clock supplied from the clock oscillator is converted by each of the clock control sections to a clock with a minimum clock number required to operate each of the corresponding respective blocks and supplied to each of the corresponding respective blocks.

Each of the clock control sections can be composed of a counter that counts the clock of the clock oscillator, a frequency dividing ratio setting section that sets a frequency dividing ratio, and a comparison section that compares outputs of the counter and the frequency dividing ratio setting section and outputs a divided clock that is set by the frequency dividing ratio setting section.

A latch circuit can be provided that receives inputs of the clock supplied from the clock oscillator and the clock supplied from the comparison section, and an AND circuit that provides a logical product of the clock supplied from the clock oscillator and the clock supplied from the latch circuit and supplies the logical product to each of the corresponding respective blocks.

The present invention can also provide a clock control method of supplying a clock oscillated by a clock oscillator to a plurality of blocks. The method includes: supplying the clock supplied from the clock oscillator to a frequency divider circuit that is connected to each of the blocks, and controlling the frequency divider circuit by a CPU to convert the clock to a clock with a minimum clock number required to operate each of the corresponding respective blocks and supply the clock to each of the corresponding respective blocks.

The present invention can also provide a clock control method of supplying a clock oscillated by a clock oscillator to a plurality of blocks. The method includes: supplying the clock supplied from the clock oscillator to a clock stop section that is connected to each of the blocks, and controlling the clock stop section by a CPU to stop supplying the clock to any of the blocks that do not need the clock.

In the clock control system and method that supplies a clock to the plurality of blocks, the clock stop section can be equipped with an AND circuit that is connected to each of the blocks and receives an input of the clock of the clock oscillator and a flip-flop that provides an input signal to the AND circuit. The flip-flop can be controlled by a CPU to turn on or off outputting the clock from the AND circuit. The present invention can perform: supplying the clock supplied from the clock oscillator to a clock control section that is connected to each of the blocks, converting with the clock control section the clock to a clock with a minimum clock number required to operate each of the corresponding respective blocks, and supplying the clock to each of the corresponding respective blocks.

DETAILED DESCRIPTION OF PREFERRED EMBODIMENTS

A clock control system in accordance with exemplary embodiments of the present invention is described below with reference to the accompanying drawings.

Figure 1:
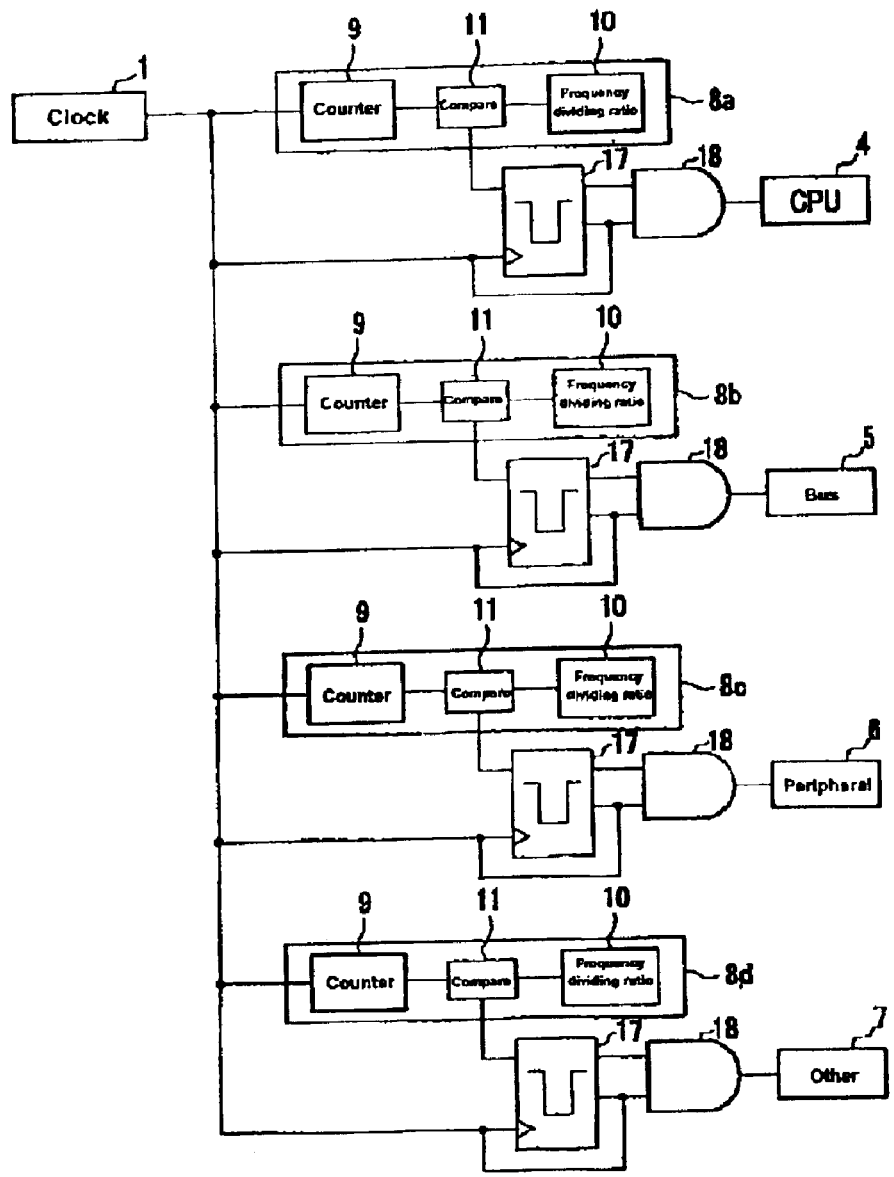
FIG. 1 is a schematic of a clock control system in accordance with a first exemplary embodiment of the present invention.
Figure 4:
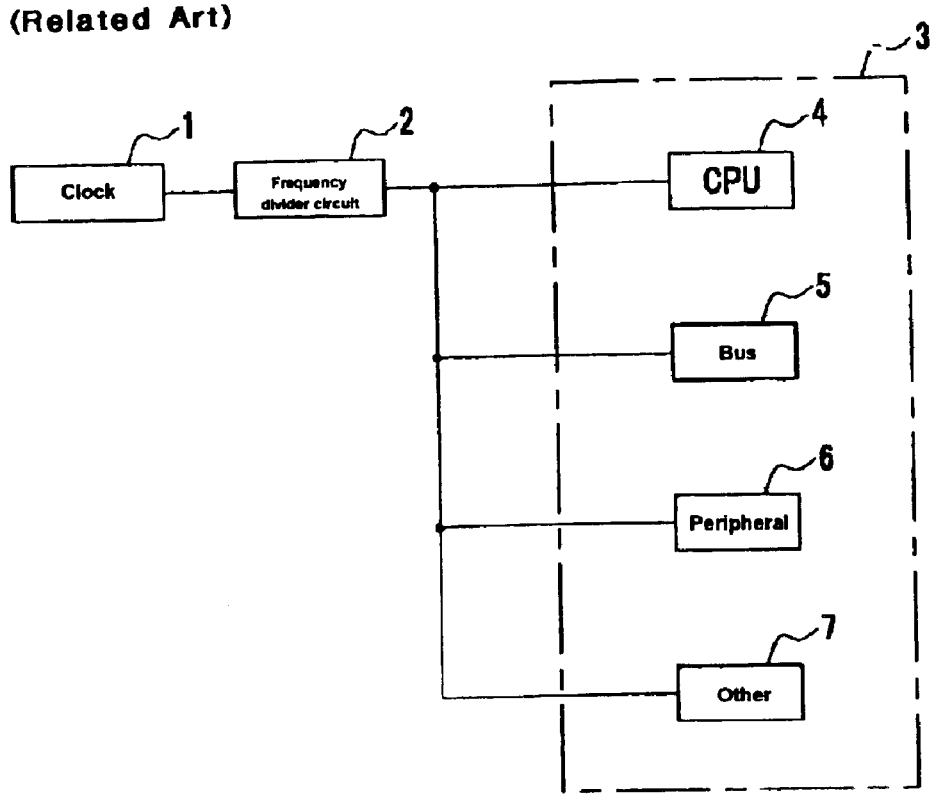
FIG. 4 is a schematic of a related art clock control system.

FIG. 1 shows a clock control system in accordance with a first exemplary embodiment of the present invention. Components in FIG. 1 that are the same components as those shown in FIG. 4 or have the same functions are assigned the same reference numerals.

FIG. 1 shows clock control sections 8a, 8b, 8c and 8d that are connected to blocks including a CPU 4, a bus 5, a peripheral circuit 6 and another circuit 7, respectively. Each of the clock control sections is composed of a counter 9 that counts a clock from a clock oscillator 1, a frequency dividing ratio setting section 10 that sets a frequency dividing ratio, and a comparison section 11 that compares the clock number of the counter 9 with the frequency dividing ratio setting section 10 and converts the clock of the counter 9 into a clock number that is set by the frequency dividing ratio setting section 10. Reference numeral 17 denotes latch circuits 17 that each receive an output from the comparison section 11 and an input of the clock from the clock oscillator 1. An output of the latch circuit 17 and a clock of the clock oscillator 1 are inputted in an AND circuit 18, and the AND circuits provide outputs to the blocks 4, 5, 6 and 7, respectively.

Operations are described below.

Each of the frequency dividing ratio setting sections 10 in the respective clock control sections 8a, 8b, 8c and 8d sets an optimum clock frequency dividing ratio for each of the corresponding blocks 4–7. For example, when the clock control section 8a for the CPU 4 is set at a clock frequency dividing ratio of 1/1, the clock control section 8b for the bus 5 is set at 1/4, the clock control section 8c for the peripheral circuit 6 is set at 1/2, and the clock control section 8d for the other circuit 7 is set at 1/4. As a result, the comparison circuits 11 output divided clocks that are 1, 1/4, 1/2 and 1/4 of the clock number of the clock oscillator 1, respectively, which are inputted in the latch circuits 17, respectively.

When a low output from the comparison circuit 11 is inputted in the latch circuit 17, the latch circuit 17 does not provide an output, and an output of the AND circuit 18 is "0". In this case, no clock signal is inputted in the blocks, i.e., the CPU 4, the bus 5, the peripheral circuit 6 or the other circuit 7. When a high output from the comparison circuit 11 is inputted in the latch circuit 17, the latch circuit 17 provides an output, such that an output of the AND circuit 18 is "1". In this case, the clock signal is inputted in the blocks, i.e., the CPU 4, the bus 5, the peripheral circuit 6 and the other circuit 7. In this manner, an optimum clock can be supplied to each of the blocks 4–7 through setting an optional clock frequency dividing ratio by each of the respective frequency dividing ratio setting sections 10, and unnecessary clocks do not have to be supplied. As a result, lower power and power saving can be attained.

Figure 2:
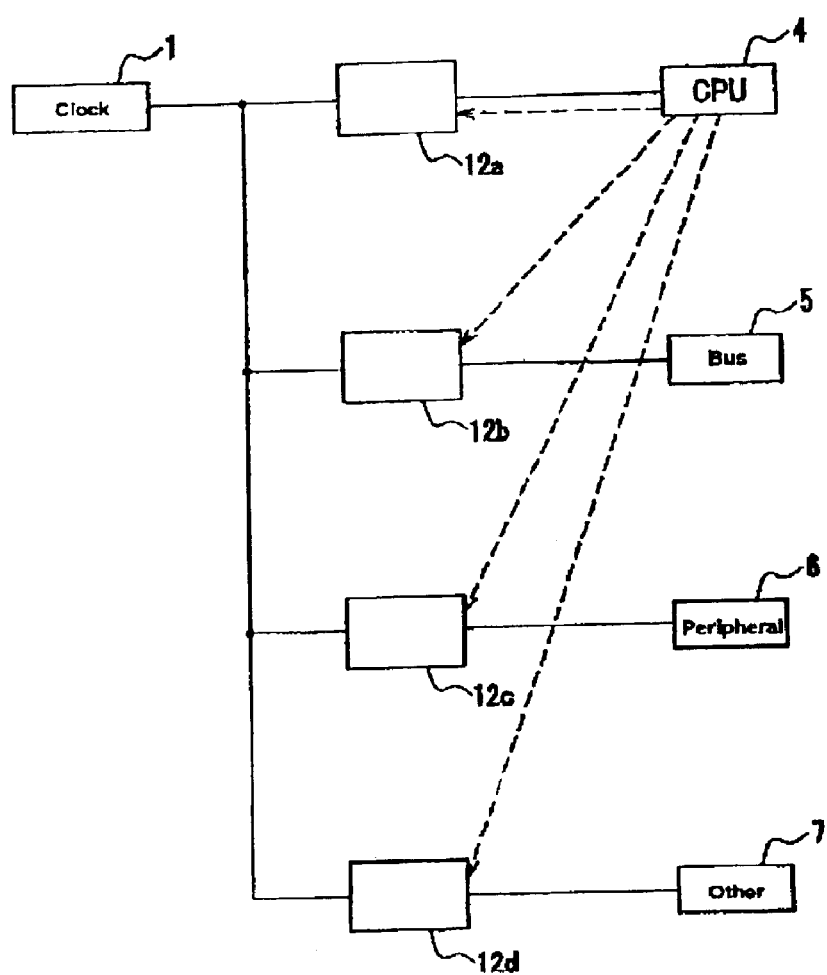
FIG. 2 is a schemati of a clock control system in accordance with a second exemplary embodiment of the present invention.

FIG. 2 shows a clock control system in accordance with a second exemplary embodiment of the present invention.

As indicated in FIG. 2, frequency divider circuits 12a, 12b, 12c and 12d are provided between a clock oscillator 1 and blocks, such as, a CPU 1, a bus 5, a peripheral circuit 6 and another circuit 7, respectively, and frequency dividing ratios of the respective frequency divider circuits 12a, 12b, 12c and 12d are varied by software controls by the CPU 4.

Also in the second exemplary embodiment, like the first exemplary embodiment, an optimum clock can be supplied to each of the blocks 4–7, and unnecessary clocks do not have to be supplied, such that lower power and power saving can be attained. Also, due to the fact that the CPU 4 in which the clock is supplied can be used for the software control of the frequency divider circuits 12a through 12d, the structure becomes simpler.

Figure 3:
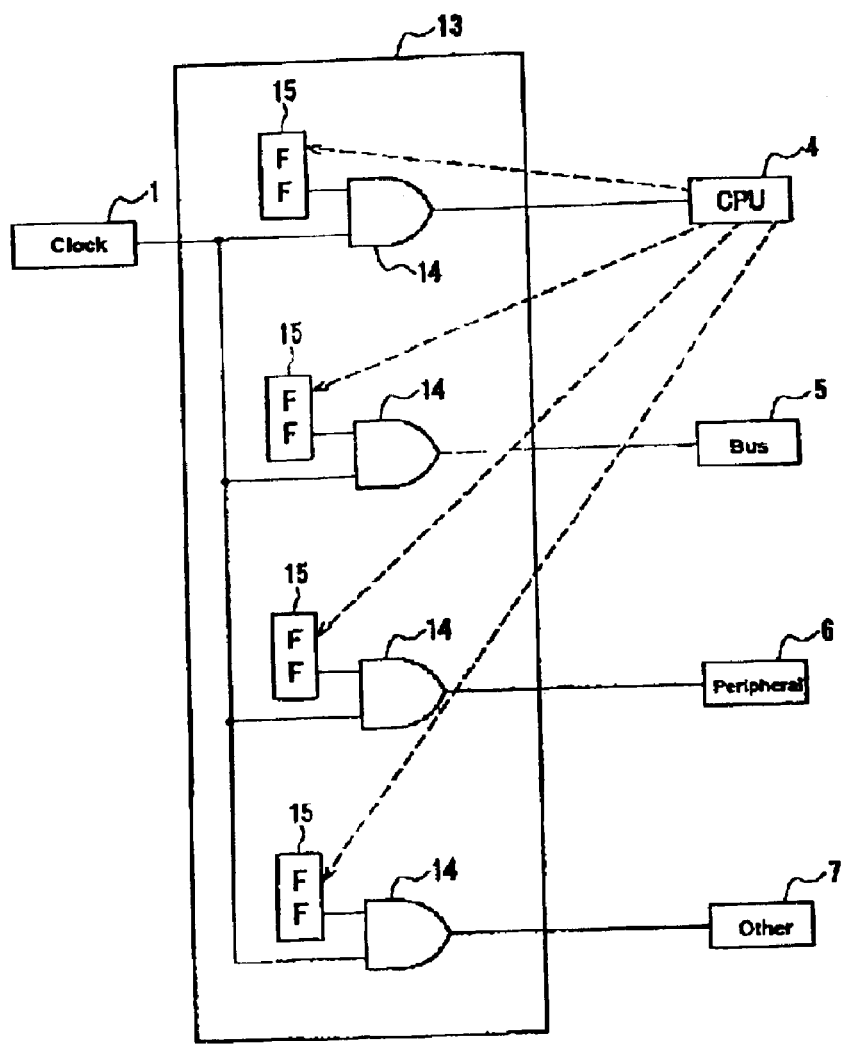
FIG. 3 is a schematic of a clock control system in accordance with a third exemplary embodiment of the present invention.

FIG. 3 shows a clock control system in accordance with a third exemplary embodiment of the present invention.

As indicated in FIG. 3, a clock stop section 13 is provided between a clock oscillator 1 and blocks, such as a CPU 4, a bus 5, a peripheral circuit 6 and another circuit 7. The clock stop section 13 is equipped with AND circuits 14 provided between the clock oscillator 1 and the respective blocks 47, and flip-flops 15 that output clock pulses to the corresponding respective AND circuits 14. Each of the AND circuits 14 provides a logical product of outputs of the clock oscillator 1 and each of the corresponding flip-flops 15 to each of the blocks 4–7. Each of the flip-flops 15 can be read/written by the software control of the CPU 4 to thereby turn on and off the output of each of the corresponding AND circuits 14, respectively.

In the third exemplary embodiment, clocks are supplied to any of the blocks that require the clocks, and clocks are stopped from being supplied to those of the blocks that do not require the clocks. As a result, a finer clock control becomes possible and unnecessary clocks do not have to be supplied, such that the power can be lowered and power saving can be achieved. Also, due to the fact that the CPU 4 in which the clock is supplied can be used for the software control of the flip-flops 15, the structure becomes simpler.

As described above, in accordance with the present invention, a clock supplied from a clock oscillator is converted by clock control sections into clocks with minimum clock numbers that are required for respective blocks and supplied to the respective blocks, such that an optimum clock can be supplied to each of the blocks; also unnecessary clocks do not have to be supplied. Accordingly, the invention is effective in saving power.

Also, in accordance with the present invention, a clock supplied from a clock oscillator is supplied to frequency divider circuits that are connected to respective blocks, and the frequency divider circuits are controlled by a CPU, such that minimum frequencies required for the respective blocks are supplied. Accordingly, the invention can provided a system with a simple structure due to the fact that the frequency divided clocks can be controlled by the software control of the CPU.

Also, in accordance with the present invention, a clock stop section may stop supplying a clock supplied from a clock oscillator to unnecessary blocks. As a result, a finer clock control becomes possible and unnecessary clocks do not have to be supplied, such that the power can be lowered and power saving can be achieved.

What is claimed is:

1. A clock control system that supplies a clock oscillated by a clock oscillator to a plurality of blocks, the clock control system comprising:

a plurality of clock control sections that are supplied with the clock oscillated by the clock oscillator; and a plurality of blocks connected to the clock control sections, respectively, the clock supplied from the clock oscillator being converted by each of the clock control sections to a clock with a minimum clock number required to operate each of the corresponding respective blocks and supplied to each of the corresponding respective blocks.

2. The clock control system according to claim 1, each of the clock control sections being composed of a counter that counts the clock of the clock oscillator, a frequency dividing ratio setting section that sets a frequency dividing ratio, and a comparison section that compares outputs of the counter and the frequency dividing ratio setting section and outputs a divided clock that is set by the frequency dividing ratio setting section.

3. The clock control system according to claim 1, further comprising a latch circuit that receives inputs of the clock supplied from the clock oscillator and the clock supplied from the comparison section, and an AND circuit that provides a logical product of the clock supplied from the clock oscillator and the clock supplied from the latch circuit and supplies the logical product to each of the corresponding respective blocks.

4. A clock control method of supplying a clock oscillated by a clock oscillator to a plurality of blocks, the clock control method comprising:

supplying the clock supplied from the clock oscillator to a frequency divider circuit that is connected to each of the blocks; and controlling the frequency divider circuit by a CPU to convert the clock to a clock with a minimum clock number required to operate each of the corresponding respective blocks and supply the clock to each of the corresponding respective blocks.

5. A clock control method of supplying a clock oscillated by a clock oscillator to a plurality of blocks, the clock control method comprising:

supplying the clock supplied from the clock oscillator to a clock stop section that is connected to each of the blocks; and controlling the clock stop section by a CPU to stop supplying the clock to any of the blocks that do not need the clock, the clock stop section being equipped with an AND circuit that is connected to each of the blocks and receives an input of the clock of the clock oscillator and a flip-flop that provides an input signal to the AND circuit, further including controlling the flip-flop by a CPU to turn on or off outputting the clock from the AND circuit.

* * * * *